(12) United States Patent
Canelones et al.

(10) Patent No.: US 6,802,007 B1
(45) Date of Patent: Oct. 5, 2004

(54) PRIVACY AND SECURITY FOR SMARTCARDS IN A METHOD, SYSTEM AND PROGRAM

(75) Inventors: Dawn Marie Canelones, Cedar Park, TX (US); Rabindranath Dutta, Austin, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,573

(22) Filed: Apr. 24, 2000

(51) Int. Cl.[7] ................................................. H04L 9/00
(52) U.S. Cl. ..................... 713/193; 713/172; 713/182; 705/65
(58) Field of Search ................................ 713/172, 182, 713/189, 193; 705/67, 66, 65

(56) References Cited

U.S. PATENT DOCUMENTS

| | | | |
|---|---|---|---|
| 4,734,568 A | 3/1988 | Watanabe | 235/487 |
| 4,928,001 A | 5/1990 | Masada | 235/380 |
| 5,544,246 A | 8/1996 | Mandelbaum et al. | 380/23 |
| 5,559,886 A | 9/1996 | Drexler et al. | |
| 5,763,862 A | 6/1998 | Jachimowicz et al. | 235/380 |
| 5,774,546 A | 6/1998 | Handelman et al. | 380/4 |
| 5,796,832 A * | 8/1998 | Kawan | 705/65 |
| 5,802,519 A | 9/1998 | De Jong | 707/100 |
| 5,812,126 A | 9/1998 | Richardson et al. | |
| 5,884,029 A | 3/1999 | Brush, II et al. | |
| 5,913,030 A | 6/1999 | Lotspiech et al. | |
| 5,923,842 A | 7/1999 | Pedersen et al. | |
| 5,923,884 A | 7/1999 | Peyret et al. | 707/1 |
| 5,926,179 A | 7/1999 | Matsuda et al. | |
| 5,943,423 A * | 8/1999 | Muftic | 705/67 |
| 5,956,038 A | 9/1999 | Rekimoto | |
| 5,961,593 A | 10/1999 | Gabber et al. | |
| 5,987,438 A * | 11/1999 | Nakano et al. | 705/41 |
| 6,023,762 A * | 2/2000 | Dean et al. | 713/193 |
| 6,141,752 A * | 10/2000 | Dancs et al. | 713/172 |

FOREIGN PATENT DOCUMENTS

| | | | |
|---|---|---|---|
| EP | 0869460 A2 | 10/1998 | |
| EP | 1150197 A2 | 10/2001 | |
| WO | WO 97/22092 * | 6/1997 | G07F/7/10 |
| WO | WO 97/48040 | 12/1997 | |
| WO | WO 99/39281 | 5/1999 | |
| WO | WO 01/06468 A1 | 1/2001 | |

OTHER PUBLICATIONS

DOSS Docket SA995009—Anonymous e-commerce over the internet.

* cited by examiner

*Primary Examiner*—Matthew Smithers
*Assistant Examiner*—Minh Dieu Nguyen
(74) *Attorney, Agent, or Firm*—Marilyn Smith Dawkins; Dillon & Yudell LLP

(57) ABSTRACT

In a first embodiment, a central database accessible by registered members, including merchants, will contain all of an individual's information while a smart card will store a unique id, known as an avatar, that may be utilized to access the information on the server. The central database is accessed through an authentication service to ensure smartcard validity. The unique identity information is retrieved by smartcard readers issued to registered members. In another embodiment, all the information concerning the individual is contained within the smart card itself. In a further embodiment, data on the smartcard and the central database is arranged in an access list with the more sensitive personal information being made available only to the smartcard readers having the highest level of access. At least two avatars, horizontal and vertical, are utilized with the horizontal avatar providing id that is changeable and the vertical avatar providing non-changeable id. Very low levels of identification are contained in memory on the smartcard.

8 Claims, 6 Drawing Sheets

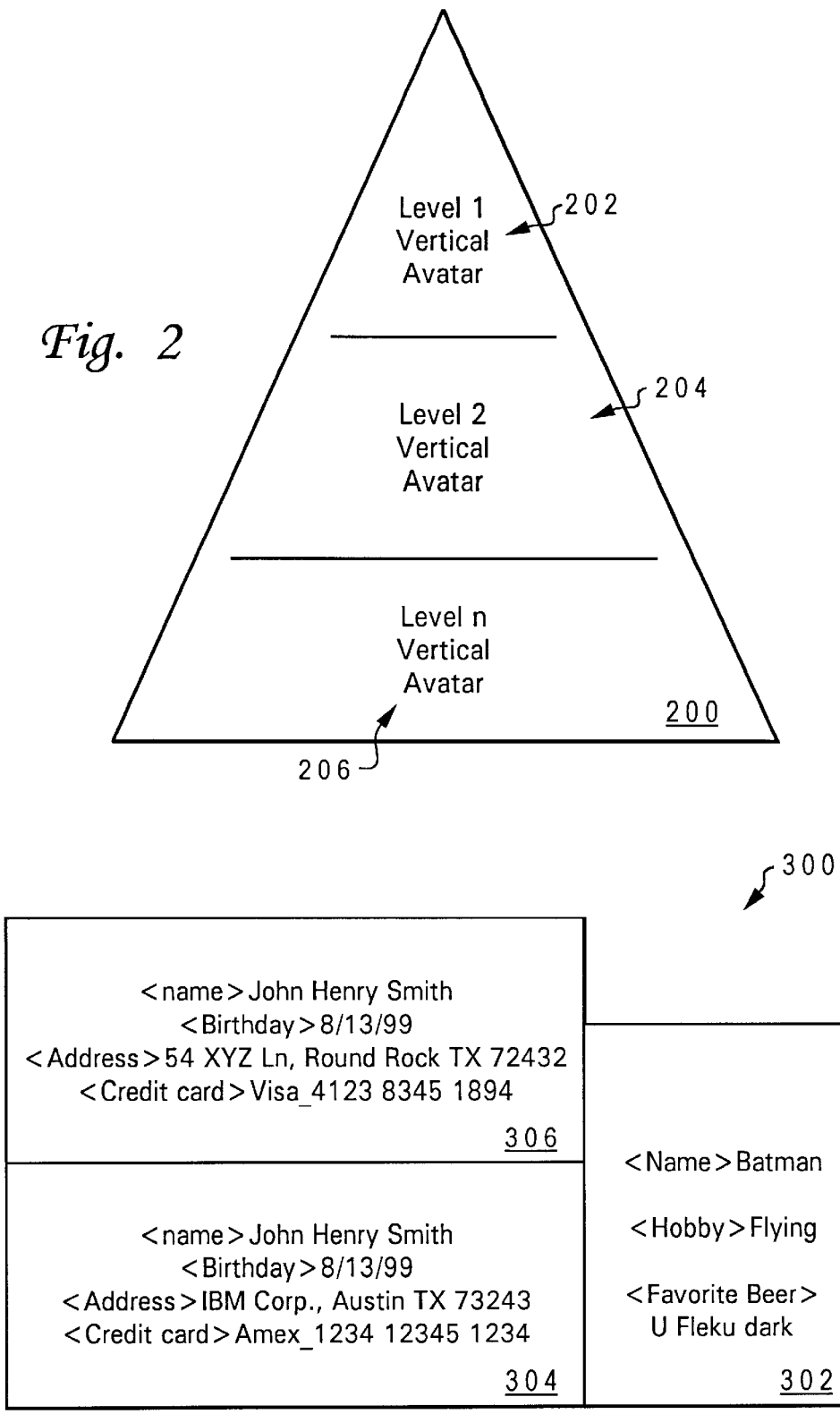

```
\personal
        \avatars (variable data-variable access control)
                \RealName  <Not variable
                        \personalInformation
                                \hobbies
                \name2 (Business ID)
                        \picture
                        \personalInformation
                                \hobbies
                \name3 (Yahoo ID)
                        \picture
                        \virtualbody1
                        \personalInformation
                                \hobbies
                \name4 (Club persona)
                        \picture
                        \virtualbody2
                                \biostatics level
                                        \height
                                        \weight
                                        \eyes
                                        \hair
                                        \extrabody parts
                                                \wings
                                                \tail
                                                        \tail length
                        \personalInformation
                                \hobbies
        \biostatics Level 1 (Data not variable-access control variable)
                \picture
                \height
                \weight
                \eyes
                \hair
        \biostatics Level 2
                \birthdate
                \birthplace
                        \biostatics Level 3
                                \home
                                \business
                                        \biostatics Level 4
                                                \SSN#
                                                \Drivers License
\smartcardinformation                           \Handgun permit
        \version
        maker
```

*Fig. 6*

PRIVACY AND SECURITY FOR SMARTCARDS IN A METHOD, SYSTEM AND PROGRAM

RELATED APPLICATIONS

The present application Ser. No. 09/557,240 is related to the subject matter of the following application: entitled "Multiple Aliases, Personalities and Preferences for an Individual User on a Browser in a Method, System and Program" and filed Apr. 24, 2000. The content of the above-referenced application is incorporated herein by reference.

BACKGROUND OF THE INVENTION

1. Technical Field

The present invention generally relates to identification and in particular to restricting identification. Still more particularly, the present invention relates to personal identification utilizing a smartcard.

2. Description of the Related Art

Smart cards are rapidly becoming the preferred means whereby identification is provided in various situations. A simple, permanent smart card may have a microprocessor with read only memory, random access memory and non-volatile memory. As is well known, a smartcard may be a plastic card and contain hardwired or fixed applications that are stored when the card is manufactured and are not changeable or movable. It is expected that within the next few years identity documents may start getting issued on smartcards in some jurisdictions. Smartcards have an advantage in that they are more or less tamper proof (at least when compared to paper documents like passports and drivers license).

Identification is a valued asset for an individual and should be kept private for security reasons. There are instances where different levels of identity are required, i.e., passing through customs/immigration requires a more detailed level of identity than that of presenting identification at a package liquor store. In one situation, customs; name, date of birth, address, recent photograph, etc. is required and in the other situation, package liquor store, only proof of age and photograph need be presented. Paper identity, that displays more than just the required low level of identification, presents a security hazard; that is, displaying a driver's license for identity at a package liquor store shows name, address, date of birth, picture, written description, medical conditions and driver's license number, when only proof of age is required.

It would be desirable therefore, to provide a system that would furnish different levels of identification. It would also be desirable to provide a method of choosing a level of identification to present that would fit the situation. It further be desirable to choose an identification that may be a false identification.

SUMMARY OF THE INVENTION

It is therefore one object of the present invention to provide a system for providing different levels of identification.

It is another object of the present invention to provide a system for providing a fake identification.

It is yet another object of the present invention to provide a method of choosing a level of identification to fit a particular situation.

The foregoing objects are achieved as is now described. In a first embodiment, a central database accessible by registered members, including merchants, will contain all of an individual's information while a smart card will store a unique id, known as an avatar, that may be utilized to access the information on the server. The central database is accessed through an authentication service to ensure smart-card validity. The unique identity information is retrieved by smartcard readers issued to registered members. In another embodiment, all the information concerning the individual is contained within the smart card itself. In a further embodiment, data on the smartcard and the central database is arranged in an access list with the more sensitive personal information being made available only to the smartcard readers having the highest level of access. At least two avatars, horizontal and vertical, are utilized with the horizontal avatar providing id that is changeable and the vertical avatar providing non-changeable id. Very low levels of identification are contained in memory on the smartcard.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 depicts a block diagram of a vertical avatar in accordance with a preferred embodiment of the present invention;

FIG. 3 is a block diagram of a horizontal avatar in accordance with a preferred embodiment of the present invention;

FIG. 6 illustrates pseudocode in accordance with a preferred embodiment of the present invention.

DETAILED DESCRIPTION OF THE PREFERRED EMBODIMENT

Figure 1A:
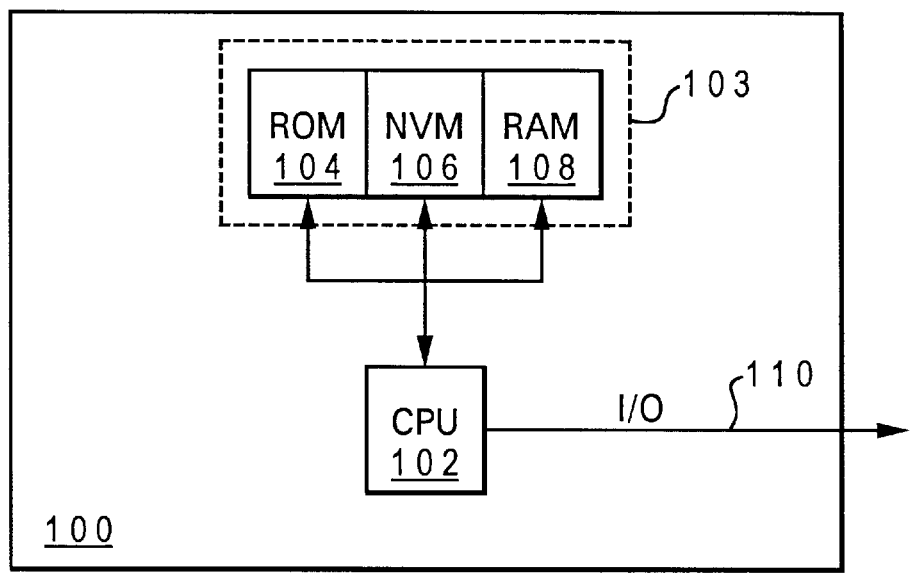
FIG. 1A depicts a smart card in which a preferred embodiment of the present invention may be implemented.

With reference now to the figures, and in particular with reference to FIG. 1A, a high-level block diagram of a basic smartcard is depicted in which a preferred embodiment of the present invention may be implemented. Smart card 100 has a microprocessor, or CPU 102, memory 103 and I/O 110. Memory 103 comprises read only memory (ROM) 104, non-volatile memory (NVM) 106 and random access memory 108. NVM 106 may be any type of writeable non-volatile memory such as a flash memory, battery backed RAM or electrically erasable programmable read only memory (EEPROM). ROM 104 typically stores the operating system which controls operation of CPU 102 and RAM 108 is temporary memory and all contents are lost when power is removed. NVM 106 may be utilized to store one or more applications for use in operating smart card 100.

CPU 102 controls operation of smart card 100 and is typically connected to all the memories within memory system 103. Outside access to memories of smart card 100 must be conducted through I/O 110, which is connected to CPU 102. There may be more than one I/O and for security reasons, CPU 102 typically authenticates and validates incoming requests. Authentication and validation may be conducted using any of a variety of security systems including cryptographic systems.

Figure 1B:
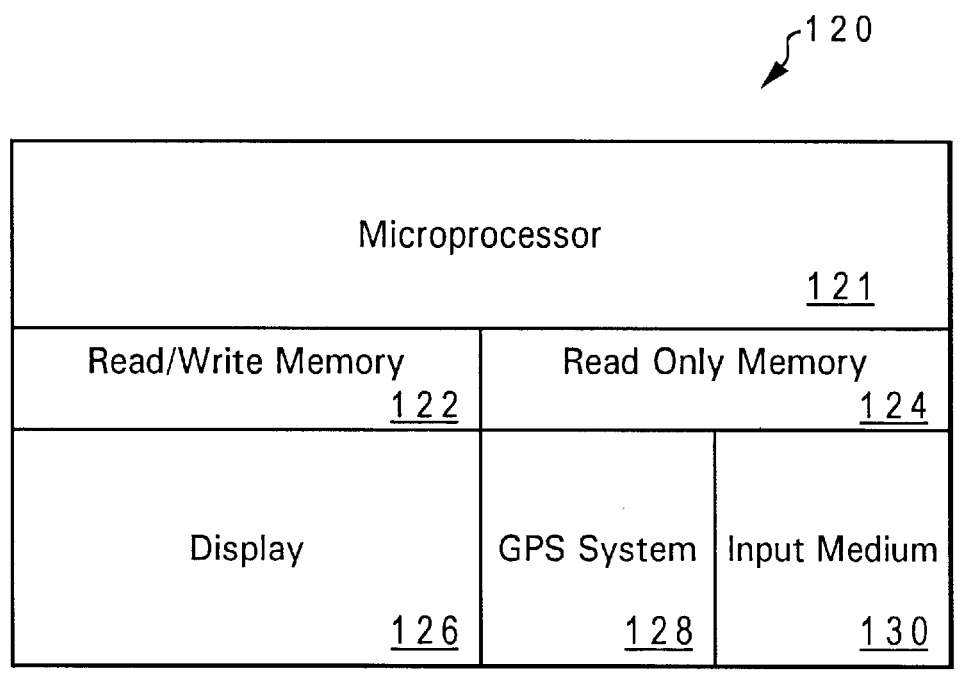
FIG. 1B is a high-level block diagram depicts a more advanced smart card in accordance with a preferred embodiment of the present invention.

Referring to FIG. 1B, a high-level block diagram depicts a more advanced smart card in accordance with a preferred embodiment of the present invention. Smart card 120 includes microprocessor 121 read/write memory 122, read only memory 124 and it may have a plurality of connectors, shown as input medium 130. The connectors provide different modes of I/O as in the basic smart card and can exchange data with a variety of external devices like Personal Computers, Bank ATM machines, Public transportation ticketing machines, etc. A Geographic Positioning System (GPS) 128 may be included in smart card 120 and can track the location of smart card 120 anywhere in the world. An additional feature would include display 126 that could display any graphics stored in ROM 124 or RAM 122 and may consist of a picture of the card holder.

Referring next to FIG. 2, a block diagram of a vertical avatar in accordance with a preferred embodiment of the present invention is depicted. An avatar is defined as an identity assumed by the cardholder. In the present invention there are two avatars, horizontal and vertical. A vertical avatar is a permanent, non-changeable identifier such as social security number, driver's license number, etc. A horizontal avatar is information that is changeable according to user preference and mood, such as name, hobbies, preferences, etc.

Vertical avatar arrangement 200 is composed of multiple levels of vertical avatar. Level 1 202 is a low level avatar that would include, for instance, the name of the cardholder—John Smith and nothing else. Level 2 204 would include further information such as the complete name and the birth date of the cardholder—John Henry Smith, Aug. 13, 1999. Level n 206 is the highest level avatar and would include many details about the card holder—John Henry Smith, Aug. 13, 1999, 123 ABC Street, Austin, Texas, 70981; DL# 0811151, etc. While the example has been constructed with name, birthday, address and credit card as fields, additional fields like security clearance, employer's name, health information like blood group type, etc. can also be included Referring to FIG. 3, a block diagram of a horizontal avatar in accordance with a preferred embodiment of the present invention is illustrated. Horizontal avatar arrangement 300 includes Level 1 avatar 302, which, when queried, provides minimal identification and in this case, a false name. This level could be used as membership and means of entry to a club. Horizontal avatars are changeable so that multiple aliases may be used and different subjects concerning the identity of the cardholder may be utilized to present as an identifier. Horizontal avatars contain information that is not permanent such as, home address, mailing address, favorite movie, hobby, etc. A Level 2 avatar, 304, may include the true name (changeable with marriage and personal choice) and the current employer (changeable). People change jobs so that a current employer is typically a temporary identification feature. Credit card numbers are not permanent identifiers and may change so a Level 3 avatar 306 includes a home address and a credit card number along with the birth date of the cardholder. Either Level 2 304 or Level 3 306 may be made available to a particular level reader.

Figure 4:
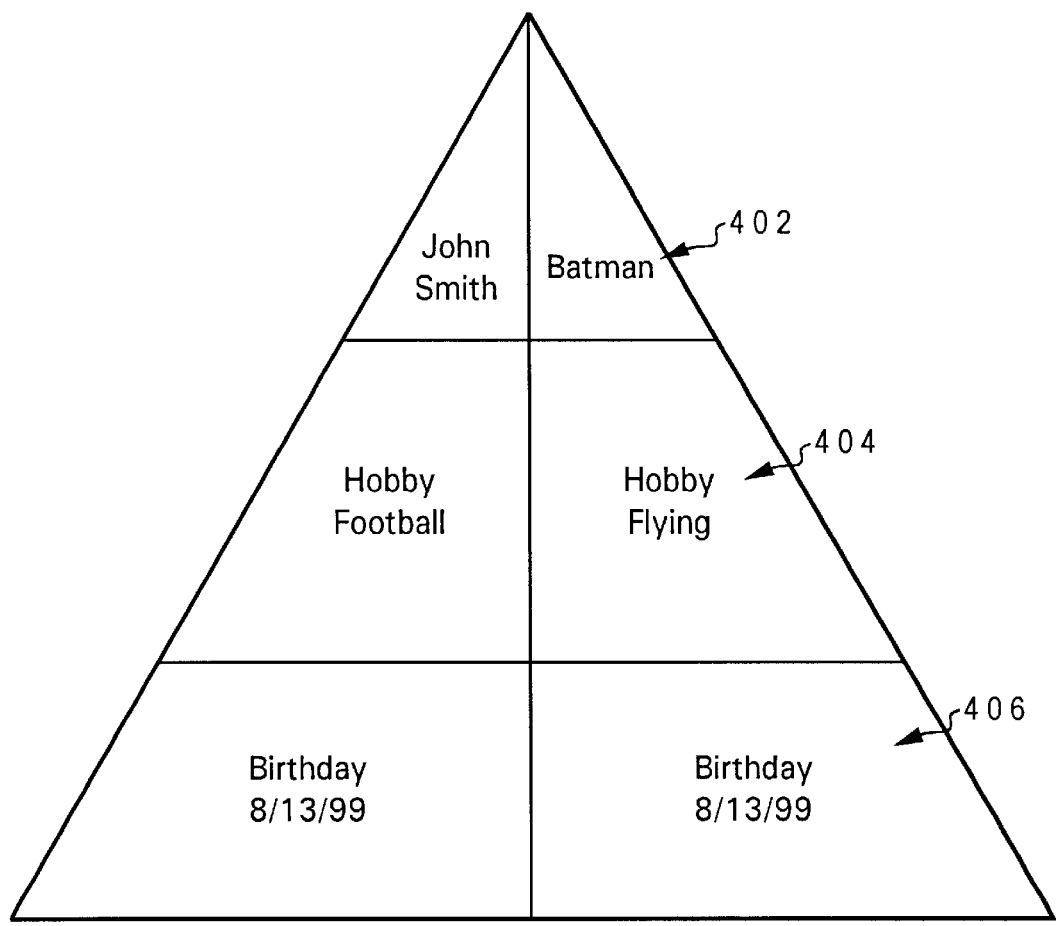
FIG. 4 depicts a block diagram of a combination horizontal and vertical avatar in accordance with a preferred embodiment of the present invention.

Referring next to FIG. 4, a block diagram of a combination horizontal and vertical avatar is illustrated in accordance with a preferred embodiment of the present invention is depicted. Both permanent and temporary identifiers are available on the same smart card. Level 1 avatar, combination horizontal and vertical avatars, of the cardholder is shown with the horizontal avatar, Batman (changeable) and the vertical avatar, John Smith (non-changeable). Level 2 avatar 404 is shown and contains variable data indicating two hobbies. Level 3 avatar 406 provides fixed data in both the John Smith vertical avatar and the Batman horizontal avatar.

Figure 5A:
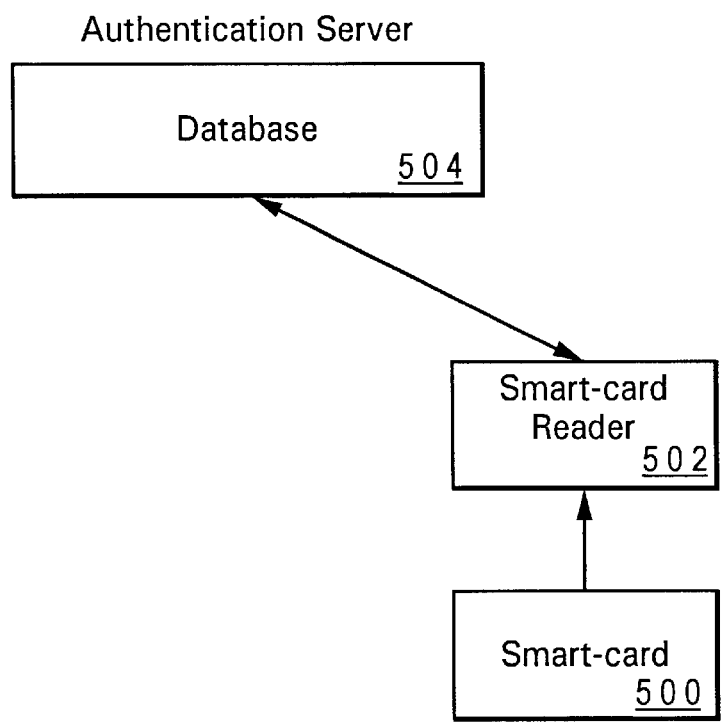
FIG. 5A illustrates a high-level block diagram illustrating authentication in accordance with a preferred embodiment of the present invention.

Referring now to FIG. 5A, a high-level block diagram illustrating authentication in accordance with a preferred embodiment of the present invention is shown. A central database stored on authentication server 504 contains all of the individual's information and smart card 500 stores a unique ID to access the information on server 504. The cardholder is able to configure access rights of various entities that request information from smart card 500 through the use of smart card reader 502. Access is granted based on groups (e.g., all bars have been granted access to level 2 data) or specific entities (e.g., Blue Bell Bar has been granted access to level 2 data).

The cardholder presents smart card 500 to a merchant and the smart card is inserted in smart card reader 502. Smart card reader 502 transmits both the reader ID (encrypted) and the smart card ID (encrypted) to the authentication server and requests a specific level of information. Server 504 decrypts the ID's and if the reader ID is on an access control list, by group or specifically, established by the cardholder, the request is granted. Appropriate information is gathered and returned to smart card reader.

Figure 5B:
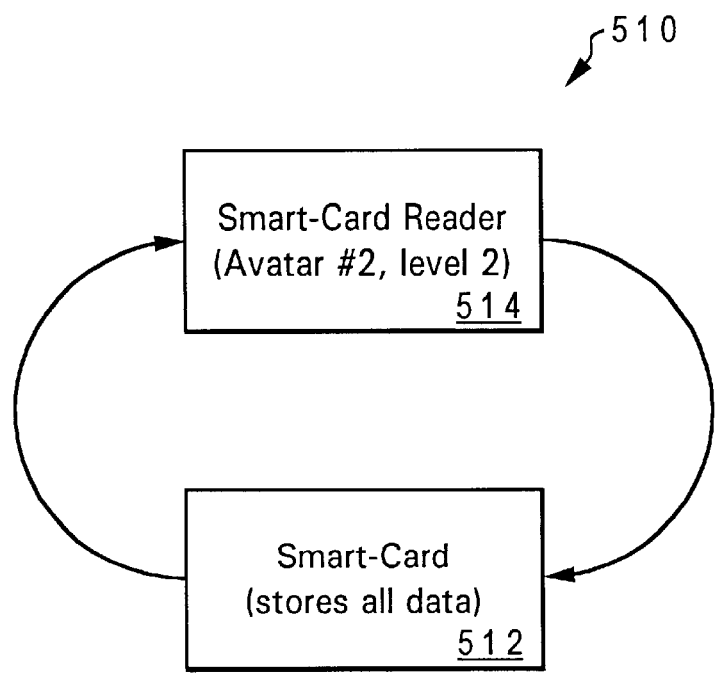
FIG. 5B depicts a smart card in accordance with a preferred embodiment of the present invention.

Referring now to FIG. 5B, a smart card in accordance with another preferred embodiment of the present invention, is illustrated. Smart card 512 contains all the cardholder information. Smart card reader 514 is only able to access a pre-determined level of information. No ID's are passed in this implementation. The cardholder presents smart card 512 to smart card reader 514. Reader 514 is identified as a specific type, or group, of merchant that is entitled to a specific level of avatar through the reader ID. Reader 514 requests the specified level of information and the appropriate information is supplied from the memory through the I/O connector on smart card 512. There will be advances in smart cards and output can be provided in audio, text or even graphic in the form of a photograph. It is likely that the output may be received through the smart card reader, but just as likely through the smart card itself.

Referring to FIG. 6, pseudocode in accordance with a preferred embodiment of the present invention is depicted. The layout of data will be logically implemented by a set of trees (directory structure). Each level of the tree will correspond to an access level. This is not the only method for providing different levels of access, a relational database may also be utilized.

Directory structures in this example use access control lists (acl). Items in italics represent data which the cardholder may change at will. Data stored in the select directory may be in XML format and that file may optionally be encrypted for added security.

Figure 7:
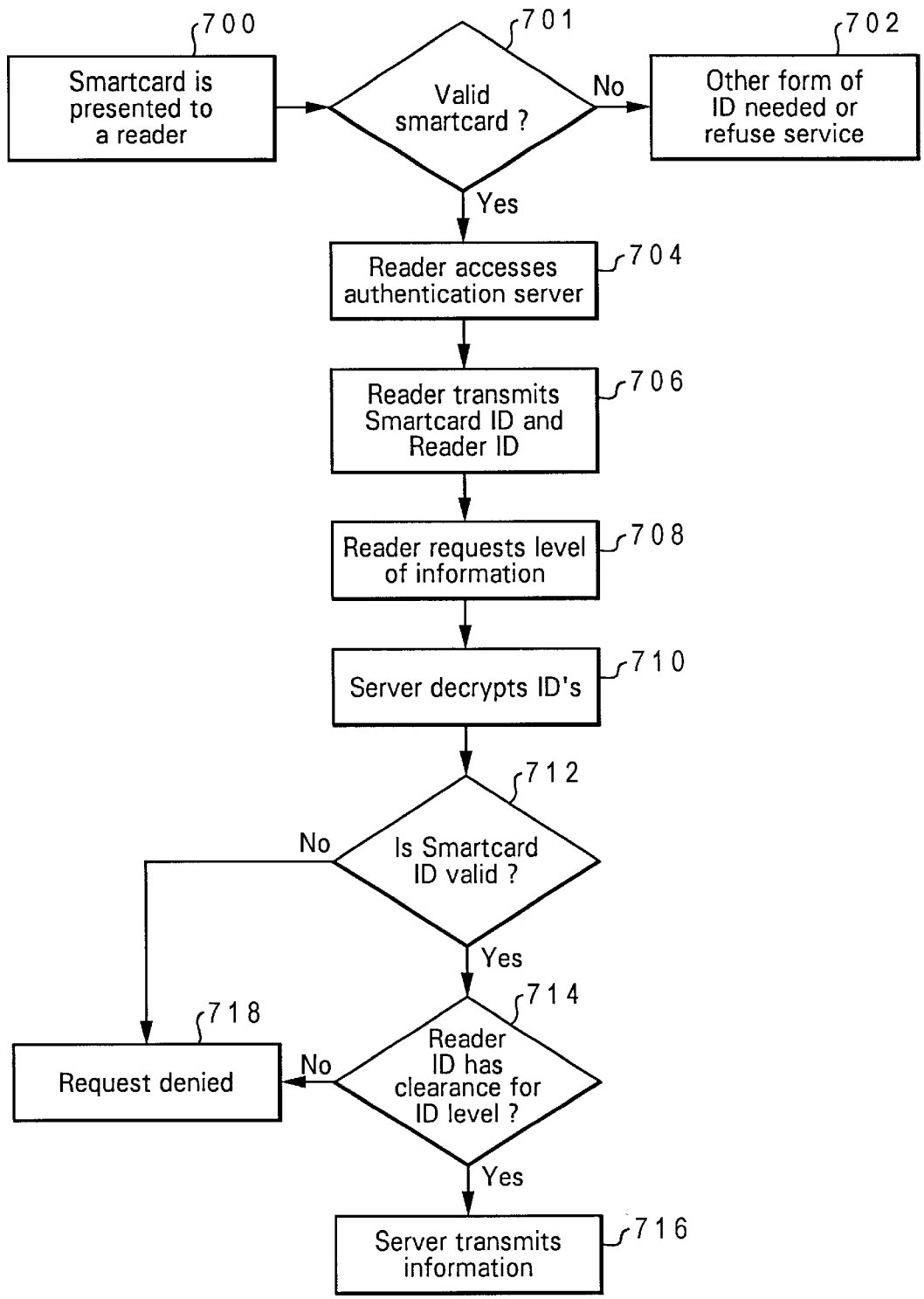
FIG. 7 depicts a method for providing security and privacy in smart cards in accordance with a preferred embodiment of the present invention.

Referring now to FIG. 7, a method for providing security and privacy in smart cards in accordance with a preferred embodiment of the present invention is depicted. The process begins with step 700, which depicts a smart card being presented to a smart card reader. The process then proceeds to step 701, which illustrates a determination of whether the smart card is valid. If the determination is made that the smart card is not valid, the process passes to step 702, which depicts the merchant refusing the card or requiring some other form of ID. If the determination is made that the smart card is valid, the process instead proceeds to step 704, which illustrates the reader accessing the authentication server.

The process continues to step 706, which depicts the reader transmitting its own ID and the smart card ID to the server. The process then passes to step 708, which illustrates the reader requesting a level of information. Next, the process moves to step 710, which depicts the server decrypting the reader and smart card ID. The process then passes to step 712, which illustrates the server determining if the smart card ID is valid. If the smart card ID is valid, the process then passes to step 714, which depicts a determination of whether the reader has clearance for the ID level requested. If the determination is made that the reader has clearance, the process proceeds to step 716, which illustrates the server transmitting the requested ID information to the reader.

If the determination is made that the reader does not have clearance for the requested information, the process proceeds instead to step 718, which depicts the server denying the request to the smart card reader. Returning to step 712, if the determination is made that the smart card ID is not valid the process continues to step 718, which illustrates the server denying the request for information.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A system for providing a high level of security and privacy in a smart card, comprising:

a smart card including: storage means for storing a plurality of low level identities of card holders on said smart card and means for choosing among said low level identities to make available to specified classes of smart card readers;

a server connected to a network;

a database for maintaining identity information associated with said a smart card;

a smart card reader with an identifying code connected to said network;

decoding means in said smart card reader for reading a unique code from said smart card;

means for transmitting said unique code and said identifying code to said server;

means for comparing said unique code to said identity information in said database;

means for utilizing said unique code for requesting a specific identity level from said database on said authentication server; and transmission means for sending information associated with said specific identity level only if said specific identity level is authorized for said requesting smart card reader.

2. The system of claim 1, further comprising:

comparison means for comparing said specific identity level requested with a level previously authorized by said smart card holder.

3. The system of claim 1, further comprising:

means for authorizing a specific level of identity available to each said class of smart card readers.

4. The system of claim 1, further comprising:

means for providing at least two identity classes of said card holder.

5. The system of claim 1, wherein providing at least two identity classes of said card holder, further comprises:

means for installing a first identity class that contains changeable identity information; and means for installing a second identity class that contains identity information that is not changeable.

6. A portable storage device comprising:

a plurality of identity types associated with a holder of the portable storage device; and means for restricting access to each given one of said plurality of identity types to a separate specified class of smart card readers.

7. The device of claim 6 wherein at least one of the plurality of identity types is a specific identity type from a plurality of identity levels of non-changing identity information.

8. The device of claim 7 wherein at least one of the plurality of identity types is a specific identity type from a plurality of horizontal avatars having changeable identity information.

* * * * *